United States Patent [19]

Van Weynbergh et al.

[11] Patent Number: 5,447,706
[45] Date of Patent: Sep. 5, 1995

[54] DIRECT SYNTHESIS OF HYDROGEN PEROXIDE BY HETEROGENEOUS CATALYSIS, CATALYST FOR THE SAID SYNTHESIS AND METHOD OF PREPARATION OF THE SAID CATALYST

[75] Inventors: Jacques Van Weynbergh, Bruxelles; Jean-Paul Schoebrechts, Grez-Doiceau; Colery: Jean-Claude, Chaumont-Gistoux, all of Belgium

[73] Assignee: Solvay Interox, Brussels, Belgium

[21] Appl. No.: 108,629

[22] PCT Filed: Feb. 25, 1992

[86] PCT No.: PCT/EP92/00404
§ 371 Date: Oct. 4, 1993
§ 102(e) Date: Oct. 4, 1993

[87] PCT Pub. No.: WO92/15520
PCT Pub. Date: Sep. 17, 1992

[30] Foreign Application Priority Data

Mar. 5, 1991 [BE] Belgium ................ 9100205

[51] Int. Cl.⁶ .............. B01J 27/053; C01B 15/01
[52] U.S. Cl. .................. 423/584; 502/213; 502/217
[58] Field of Search .......... 502/217, 328; 423/584

[56] References Cited

U.S. PATENT DOCUMENTS

| | | | |
|---|---|---|---|
| 2,418,851 | 4/1947 | Rosenblatt et al. | 502/217 |
| 4,007,256 | 2/1977 | Kim et al. | 423/584 |
| 4,279,883 | 7/1981 | Izumi et al. | 423/584 |
| 4,661,337 | 4/1987 | Brill | 423/584 |
| 4,832,938 | 5/1989 | Gosser et al. | 423/584 |

FOREIGN PATENT DOCUMENTS

| | | | |
|---|---|---|---|
| 462984 | 2/1950 | Canada | 502/217 |
| 0049810A1 | 4/1982 | European Pat. Off. | |
| 0274830A2 | 7/1988 | European Pat. Off. | |
| 0342047A2 | 11/1989 | European Pat. Off. | |
| 0342048A2 | 11/1989 | European Pat. Off. | |
| 2301506 | 9/1976 | France. | |
| 1037427 | 8/1958 | Germany | 502/217 |
| 19987 | 2/1978 | Japan | 502/217 |
| 78651 | 3/1990 | Japan | 502/217 |
| 667552 | 3/1952 | United Kingdom | 502/217 |
| 266735 | 4/1970 | U.S.S.R. | 502/217 |

*Primary Examiner*—Wayne Langel
*Attorney, Agent, or Firm*—Spencer, Frank & Schneider

[57] ABSTRACT

Method for the direct synthesis of an aqueous solution of hydrogen peroxyde from hydrogen and oxygen by hydrogenous catalysis in a three-phase system in which the hydrogen and oxygen are reacted directly in a gas state, at a pressure above atmospheric pressure, on the surface of a solid hydrogenous catalyst in suspension in a granular state in an aqueous liquid phase, said catalyst consisting of a metal compound selected from pure palladium or an association of palladium with at least one other noble metal, and impregnated on a substrate comprising at least one compound selected from alkaline-earth metal sulfates or phosphates. A catalyst is disclosed for the production of an aqueous liquid phase of hydrogen peroxyde consisting of a metal compound selected from pure palladium or an association of palladium with at least one another noble metal, and impregnated on a substrate comprising at least one compound selected from alkaline-earth metal sulfates or phosphates. A method of preparing the catalyst by precipitation of the palladium or palladium mixture with at least one other noble metal on the granular substrate is also disclosed.

10 Claims, No Drawings

DIRECT SYNTHESIS OF HYDROGEN PEROXIDE BY HETEROGENEOUS CATALYSIS, CATALYST FOR THE SAID SYNTHESIS AND METHOD OF PREPARATION OF THE SAID CATALYST

The present invention relates to a method for direct synthesis of hydrogen peroxide from hydrogen and oxygen. It more particularly concerns a method for synthesis of hydrogen peroxide by heterogeneous catalysis.

FIELD OF THE INVENTION

It also relates to a catalyst for the said method as well as a method for manufacture of this catalyst.

TECHNOLOGY REVIEW

It is known by Patent Application EP-A2-0,274,830 (du Pont de Nemours) to synthesize hydrogen peroxide by direct reaction of hydrogen with oxygen in the presence of a solid metal catalyst chosen from palladium, platinum or a combination of these two metals in an acidic aqueous reaction mixture containing bromide as a promoter or inhibitor of decomposition of the peroxide formed. The metal of the catalyst can be supported on an appropriate support chosen from carbon, silica, alumina or ion exchange resins.

In Patent Application EP-A2-0,342,047 (dupont de Nemours), it is furthermore disclosed that it is advantageous for the acid and bromide ion concentrations to lie, independently of each other, between 0.001 M and 0.05 M.

It is also disclosed in U.S. Pat. No. 4,832,938 (du Pont de Nemours) that the Pt/(Pt+Pd) ratio by weight should preferably be in the range from 0.02 to 0.2.

In all these known methods, the selectivity of the reaction with respect to the reactants and, in particular, with respect to the hydrogen used, is not very high and generally lies between 50 and 70% molar. In the best of these cases, it never exceeds 77% molar. Now, as regards the economics of the method, the cost of the hydrogen plays an important part in the cost price of the hydrogen peroxide produced. Moreover, it is not uncommon for the support of the catalyst to be partially dissolved in the acidic reaction mixture.

SUMMARY OF THE INVENTION

The subject of the present invention is a method of direct synthesis of hydrogen peroxide from hydrogen and oxygen which does not have the disadvantages of the known methods.

For this purpose, the invention relates to a method for direct synthesis of an aqueous solution of hydrogen peroxide from hydrogen and oxygen by heterogeneous catalysis in a three-phase system, according to which hydrogen and oxygen are directly reacted in the gaseous state and at a pressure greater than atmospheric pressure, at the surface of a solid heterogeneous catalyst suspended in the granular state in a liquid aqueous phase, the catalyst consisting of a metal compound chosen from pure palladium or a combination of palladium with at least one other noble metal, and the metal compound being impregnated on a support comprising at least one compound chosen from the sulphates or the phosphates of alkaline-earth metals.

DETAILED DESCRIPTION OF THE INVENTION

Direct synthesis of an aqueous solution of hydrogen peroxide is intended to designate the synthesis of solutions of $H_2O_2$ in water from its elements, namely oxygen and hydrogen. According to the invention, these two reactants are used in regulated conditions of temperature and pressure so that they are in the gaseous state, the pressure chosen being however greater than atmospheric pressure.

The catalyst in accordance with the method according to the invention belongs to the class of solid catalysts used in heterogeneous catalysis, that is to say a catalysis which acts at the interface between the catalytic solid and one or more other phases containing the reactants. According to the invention, the solid catalyst is maintained in suspension in the form of granules in a liquid aqueous phase capable of collecting and solubilizing the hydrogen peroxide formed. The two gaseous reactants, oxygen and hydrogen, are put in contact with the catalyst in suspension in the solution. The catalyst moreover consists of pure palladium or, in an alternative way which is not preferred, of a combination of palladium with another noble metal. The palladium or the combination of palladium is furthermore impregnated on a support consisting of a sulphate or a phosphate of an alkaline-earth metal. Pure palladium is intended to designate a metal containing more than 99.90% by weight of palladium.

When the catalyst consists of a combination of palladium with another noble metal, the other noble metal should be distributed homogeneously in the bulk of the palladium. The homogeneous distribution of the other noble metal can be produced on the atomic scale, for example when the combination is in the form of a homogeneous alloy. The distribution of the other noble metal can also be produced on a more macroscopic scale such as, for example, the dispersion of small agglomerations of the other noble metal in the palladium, or alternatively the formation of a thin layer of a coating of the other noble metal around the grains of palladium. The other noble metal will preferably be chosen from palladium, rhodium and gold. It can also consist of a mixture of these metals. Of these noble metals, gold is particularly preferred. The proportion by weight of the other noble metal in the combination can vary within wide limits. It is advantageous for it not to exceed 80% of the total weight of the metals of the catalyst and, preferably, 60% of the total weight of these metals.

The support of the catalyst comprises, according to the invention, at least one compound chosen from the sulphates or the phosphates of the alkaline-earth metals, or a mixture of the latter. Sulphate or phosphate is intended to designate an alkaline-earth metal salt which contains the neutral sulphate ($SO_4^{--}$), monohydrogensulphate or acidic sulphate ($HSO_4^{-}$), neutral orthophosphate ($PO_4^{---}$), monohydrogenorthophosphate ($HPO_4^{--}$) or dihydrogenorthophosphate ($H_2PO_4^{-}$) group. All alkaline-earth metals are suitable so long as their sulphate and/or phosphate is insoluble in aqueous solution and, preferably, in acidic aqueous solution, in particular in solutions with pH between 0 and 4. It is advantageous for the alkaline-earth metal to be chosen from magnesium, calcium, strontium and barium. The neutral sulphate of barium ($BaSO_4$) is particularly preferred because of its low solubility in aqueous solution and in acidic aqueous solution. The pure palladium catalyst impregnated on a barium sulphate support has given excellent results.

In one preferred variant of the method of the invention, the solubility of the $BaSO_4$ is further decreased to a very low value by introducing into the reaction mixture a small quantity, between 0.001 and 0.2 mol per liter, of $SO_4^{--}$ ions.

The proportion by weight of palladium, or of the combination of palladium with another noble metal, with respect to the support must, in the catalyst in accordance with the method according to the invention, be in the range between 0.1 and 15 g of noble metals per 100 g of the total weight of noble metals and support. Preferably, this proportion will be in the range between 0.2 and 10 g of noble metal per 100 g of the total weight of catalyst.

The particle size—which the catalyst has influences the performance obtained. A decrease in the size of the granules of the catalyst results in the increased efficiency of the latter, that is to say the reduction of the extent of intraparticular diffusion phenomena as well as an increase in the conversion ratio of the reactants and a decrease in selectivity.

The choice of the size of the catalyst particles will therefore be the result of an optimization: this size will have to be sufficiently small in order to ensure good efficiency and good conversion of the reactants, but it cannot however become too small at the risk of giving rise to filtration difficulties. In practice, catalyst granules will be selected which have a mean diameter in the range between 0.5 and 500 $\mu$m and, preferably, between 10 and 100 $\mu$m. Moreover, the pore volume of these catalyst granules must be sufficiently high in order to ensure a high solid/gas contact area. Generally, it is suitable to choose catalysts in which the pore volume of the granules is between 0.01 and 1.5 $cm^3/g$ and, preferably, between 0.1 and 1.2 $cm^3/g$.

The optimum quantity of catalyst to be used will be that which corresponds to the boundary between the zone in which the reaction is controlled kinetically and the zone in which it is controlled by diffusion. In practice, this boundary corresponds generally to a quantity of palladium or of a combination of palladium with another noble metal of between 50 and 150 mg Pd/l of liquid phase and, preferably, between 75 and 110 mg Pd/l.

In addition to their catalytic properties for the reaction of direct synthesis of the hydrogen peroxide, the palladium catalysts are unfortunately also decomposition catalysts of the peroxide formed. It is consequently advantageous for the liquid phase to contain a compound capable of poisoning the hydrogen peroxide decomposition sites present on the surface of the catalyst. Halide ions are good representatives of these compounds. Their optimum concentration must be determined by means of laboratory tests within the capability of the person skilled in the art. This concentration must be sufficient in order to achieve poisoning the majority of the decomposition sites of the catalyst and, at the same time, not too high in order to avoid as much as possible the oxidation reaction of the halide ion by the hydrogen peroxide. Chloride, bromide and iodide ions are suitable to inhibit the decomposition sites of the catalyst. The bromide ion has given the best results in a concentration of between 0.05 and 3 mmol/l of liquid phase and, preferably, between 0.1 and 2 mmol/l.

It is advantageous for the liquid phase to contain in addition an acid with the aim of inhibiting spontaneous non-catalytic decomposition of the hydrogen peroxide, in particular that decomposition which proceeds according to the equation:

$$HO_2^- + H_2O_2 \rightarrow H_2O + O_2 + OH^-$$

However, when this concentration is too high, the solubility of the gases in the liquid phase decreases and the acid can react with the hydrogen peroxide present. As suitable acids, mention may be made of sulphuric acid and orthophosphoric acid. Orthophosphoric acid is preferred. The pH of the liquid phase is generally between 0 and 4 and, preferably, between 0.5 and 1.5.

The temperature of the reaction is normally chosen at a value of between 5° and 90° C. and, preferably, between 10° and 60° C.

The pressure chosen is greater than atmospheric pressure and is generally between 50 and 200 bar and, preferably, between 65 and 100 bar.

The invention also relates to a solid catalyst for the production of a liquid aqueous phase of hydrogen peroxide by heterogeneous catalysis of the direct synthesis reaction from gaseous hydrogen and oxygen in a three-phase system. According to the invention, the catalyst consists of a metal compound chosen from pure palladium or a combination of palladium with at least one other noble metal, the metal compound being impregnated on a support comprising at least one compound chosen from the sulphates of alkaline-earth metals.

The terms pure palladium, combination of palladium with another noble metal, sulphate and phosphate of an alkaline-earth metal have the same meaning as explained hereinabove in the description of the synthesis method according to the invention.

The invention finally relates to a method of manufacture of a solid catalyst for the production of a liquid aqueous phase of hydrogen peroxide by heterogeneous catalysis according to which, in a first step, a soluble palladium salt, or a mixture of a palladium salt with at least one salt of another noble metal, is dissolved in an acidic aqueous solution, in a second step, there is added to the aqueous solution granules of an insoluble inorganic support comprising at least one compound chosen from the sulphates of alkaline-earth metals, and the palladium or the combination of palladium with at least one other noble metal is precipitated by drop-wise addition of an aqueous solution of a strong base, preferably an aqueous sodium hydroxide solution, under strong agitation until the pH of the mixture is between 9 and 10, in a third step, the precipitate is then filtered and washed with demineralized water in order to remove the soluble ions from the precipitate, in a fourth step, the precipitate is dried, then it is activated in an oven kept at a temperature between 130° and 300° C. under a gaseous flow of hydrogen mixed with nitrogen and, in a fifth step, the catalyst is cooled under a flow of nitrogen before being stored in a sealed bottle under a nitrogen atmosphere.

Preferably, the operation of precipitating the palladium or the combination of palladium with at least one other noble metal can be carried out at a temperature close to or equal to the boiling point of the solution under atmospheric pressure. This procedure makes it possible to precipitate the noble metals on the support with quantitative yields.

EXAMPLES

The following examples are given in order to illustrate the invention, without however limiting its scope. Examples 1R to 5R are given by way of comparison and are not in accordance with the invention. Examples 6 to 10 have been produced in accordance with the invention.

1. Examples 1R to 5R: (not in accordance with the invention)

60 mg of catalyst was weighed in a glass test tube and 40 ml of an aqueous solution containing 1.6 M $H_3PO_4$ and 0.0006 M NaBr was added. The tube containing the solution was then weighed.

The test tube was placed in a thermostatic autoclave fitted with a stirrer, a thermocouple and a polytetrafluoroethylene gas supply tube and all three are immersed in the reaction solution contained in the test tube.

After closing the autoclave, a mixture of hydrogen and oxygen was admitted into the autoclave so that the mixture contained 4.5% by mole of hydrogen (i.e. a $O_2/H_2$ mole ratio of 21). The two gases had been premixed in mass flow meters.

The reaction pressure was maintained at 80 bar by means of a regulating valve placed downstream of the autoclave. The flow rate of the gaseous mixture was fixed at 100 l/h under standard conditions, the stirring speed was 1200 revolutions per minute and the duration of the test was 120 minutes.

At the end of the test, the hydrogen peroxide was titrated by iodometry and the selectivity of the reaction with respect to the hydrogen used was calculated on the basis of the increase in weight of the solution.

The selectivity with respect to the hydrogen used is defined as being the number of moles of $H_2O_2$ formed with respect to the number of moles of hydrogen used up.

Example 1R

Catalyst: Pd on carbon (5% Pd)—ALDRICH brand
Temperature: 25° C.
Concentration by weight of $H_2O_2$ at the end of test: 2.0%
Selectivity with respect to hydrogen: 71%

Example 2R

Catalyst: Pd on carbon (5% Pd)—JOHNSON MATTHEY brand
Temperature: 25° C.
Concentration by weight of $H_2O_2$ at the end of test: 2.88%
Selectivity with respect to hydrogen: 70%

Example 3R

Catalyst: Pd on $Al_2O_3$ (5% Pd)—JOHNSON MATTHEY brand
Temperature: 25° C.
Concentration by weight of $H_2O_2$ at the end of test: 4.1%
Selectivity with respect to hydrogen: 73%

Example 4R

Catalyst: Pd on $Al_2O_3$ (5% Pd)—ALDRICH brand
Temperature: 25° C.
Concentration by weight of $H_2O_2$ at the end of test: 7.6%
Selectivity with respect to hydrogen: 70%

Example 5R

Catalyst: Pd on $SiO_2/Al_2O_2$ (5% Pd)
Temperature: 25° C.
Concentration by weight of $H_2O_2$ at the end of test: 2.46%
Selectivity with respect to hydrogen: 71%

2. Examples 6 to 9: (in accordance with the invention)

The conditions of Examples 1R to 5R were repeated, with the exception of Example 9, in which the weight of catalyst used was 100 mg.

Example 6

Catalyst: Pd on $BaSO_4$ (5% Pd)—ENGELHARD brand
Temperature: 25° C.
Concentration by weight of $H_2O_2$ at the end of test: 4.68%
Selectivity with respect to hydrogen: 94%

Example 7

Catalyst: Pd on $BaSO_4$ (5% Pd)—ALDRICH brand
Temperature: 25° C.
Concentration by weight of $H_2O_2$ at the end of test: 3.36%
Selectivity with respect to hydrogen: 98%

Example 8

Catalyst: Pd on $BaSO_4$ (5% Pd)—JOHNSON MATTHEY brand
Temperature: 25° C.
Concentration by weight of $H_2O_2$ at the end of test: 4.22%
Selectivity with respect to hydrogen: 90%

Example 9

Catalyst: Pd on $BaSO_4$ (2% Pd)—DODUCO brand
Temperature: 25° C.
Concentration by weight of $H_2O_2$ at the end of test: 4.8%
Selectivity with respect to hydrogen: 88%

Example 10: (in accordance with the invention)

Preparation of the $BaSO_4$ catalyst 6.00 g of $BASO_4$ of analytical purity grade and of JANSSEN brand, of pore volume 0.37 $cm^3/g$, of mean diameter 3 $\mu m$ and of specific surface area 2 $m^2/g$ was weighted in a 250 ml beaker.

1 g of $PdCl_2$ was dissolved in a 100 ml flask using 70 ml of 1N HCl while heating to 60° C. After dissolving, the solution was cooled to 20° C. and was made up to 100 ml using 1N HCl.

180 ml of demineralized water was added to the beaker containing the support, and it was stirred by means of a magnetic stirring bar, then 5.71 g of an aqueous solution of 10% by weight of NaOH was added.

In order to prepare a catalyst containing at least 1% of Pd on the support, 0.20 g of $PdCl_2$ was used for 6 g of support. The Pd was—precipitated by slowly adding, at a rate of one or two drops per second, under strong agitation, 20 ml of the master solution of $PdCl_2$ containing 0.01 g of $PdCl_2/ml$, and a check was carried out using indicator paper that the pH had risen to a value of between 9 and 10.

The precipitate formed was then filtered with a filter of type 11306 47N SARTORIUS brand, with a 0.45 $\mu m$ pore size, under a vacuum produced by a water pump, in a 47 mm diameter filter support of MILLIPORE brand. The precipitate was then washed 8 times with 50 ml of demineralized water at 80° C. in order to remove the NaCl.

The catalyst obtained by precipitation was dried by placing it on a watch glass in an oven at 110° C. for 16 hours under partial vacuum, after which the catalyst was gently removed using a glass pestle in order to eliminate lumps.

The dry catalyst was then activated by introducing it into a glass calciner with a sintered support which was placed in an oven at 150° C. The calciner was swept through the sintered support using a gaseous mixture of hydrogen and nitrogen with approximately 10% hydrogen. The treatment was carried out for 2.5 hours under a gas flow rate of 20 l/h. The calciner was then allowed to cool under a flow of nitrogen until it reached a temperature less than 50° C., and the catalyst was stored in a sealed bottle under a nitrogen atmosphere. A catalyst containing 1.2% by weight of Pd was thus obtained.

The catalyst obtained was used to produce hydrogen peroxide under the same conditions as in Examples 6 to 9, with the exception that 334 mg of catalyst was used. The results obtained were the following:
Concentration by weight of $H_2O_2$ at the end of test: 4.8%
Selectivity with respect to hydrogen: 80%

Example 11: (in accordance with the invention)

A Pd catalyst supported on $BaSO_4$ was prepared by following the procedure described in Example 10, with the exception that the precipitation of the Pd onto the support was carried out in the solution brought to the boil under atmospheric pressure.

A catalyst containing 2% by weight of Pd was thus obtained. A test of producing hydrogen peroxide in the presence of 200 mg of this catalyst, the other operating conditions being the same as in Examples 6 to 9, gave the following results:
Concentration by weight of $H_2O_2$ at end of test: 5.9%
Selectivity with respect to hydrogen: 84%

Example 12: (in accordance with the invention)

Example 11 was repeated while modifying the operating conditions of drying the catalyst so as to make it undergo an additional dehydration operation of 8 hours under nitrogen at 300° C., before activating it by treatment with the mixture of hydrogen and nitrogen.

A catalyst containing 2% by weight of Pd was obtained, which gave the following results for producing hydrogen peroxide (operating conditions identical to Examples 6 to 9, with the exception that the quantity of catalyst was fixed at 300 mg):
Concentration by weight of $H_2O_2$ at end of test: 4.5%
Selectivity with respect to hydrogen: 85%

We claim:

1. A method for direct synthesis of an aqueous solution of hydrogen peroxide from hydrogen and oxygen by heterogeneous catalysis in a three-phase system, comprising:
directly reacting hydrogen and oxygen in the gaseous state and at a pressure greater than atmospheric pressure, at the surface of a solid heterogeneous catalyst suspended in the granular state in a liquid aqueous phase, said catalyst consisting of a metal selected from the group consisting of pure palladium and a combination of palladium with at least one other noble metal, said metal impregnated on a support comprising at least one compound selected from the group consisting of sulphates and phosphates of alkaline-earth metals, to produce hydrogen peroxide, and
recovering an aqueous solution of hydrogen peroxide.

2. The method according to claim 1, wherein the alkaline-earth metal is selected from the group consisting of magnesium, calcium, strontium and barium.

3. The method according to claim 2, wherein the support consists of barium sulphate.

4. The method according to claim 1, wherein the catalyst consists of pure palladium impregnated on a barium sulphate support.

5. The method according to claim 1, wherein the mixture furthermore contains a quantity of $SO_4^{--}$ ions between 0.001 and 0.2 mol per liter.

6. The method according to claim 1, wherein in the catalyst, the quantity of palladium or of the combination of palladium with at least one other noble metal is between 0.1 and 15 g per 100 g of the total weight of metal and support.

7. The method according to claim 1, wherein the catalyst is in the form of small granules whose mean diameter is between 0.5 and 500 $\mu$m and whose pore volume is between 0.01 and 1.5 cm$^3$/g.

8. The method according to claim 1, wherein the liquid aqueous phase contains bromide ions in a concentration of between 0.05 and 3 mmol/liter of aqueous phase and that its pH is in the range between 0 and 4.

9. The method according to claim 1, wherein, in the catalyst, the quantity of palladium or of the combination of palladium with at least one other noble metal is between 0.2 and 10 g per 100 g of the total weight of the metal and support.

10. A method for preparation of a solid catalyst for production of a liquid aqueous phase of hydrogen peroxide by heterogeneous catalysis comprising:
in a first step, dissolving a soluble palladium salt, or a mixture of a soluble palladium salt with at least one soluble salt of another noble metal, in an acidic aqueous solution,
in a second step, adding to the aqueous solution granules of an insoluble inorganic support comprising at least one compound selected from the group consisting of sulphates of alkaline-earth metals, and the palladium or the combination of palladium with at least one other noble metal is precipitated by dropwise addition of an aqueous solution of a strong base under strong agitation until the pH of the mixture is between 9 and 10,
in a third step, filtering and washing the precipitate with demineralized water in order to remove the soluble ions from the precipitate,
in a fourth step, drying the precipitate, which then is activated in an oven kept at a temperature between 130° and 300° C. under a gaseous flow of hydrogen mixed with nitrogen, to form said catalyst and,
in a fifth step, cooling the catalyst under a flow of nitrogen and then storing said catalyst in a sealed bottle under a nitrogen atmosphere.

* * * * *